(12) United States Patent
Gagnon

(10) Patent No.: US 6,830,060 B2
(45) Date of Patent: Dec. 14, 2004

(54) AIR MASS FLOW CONTROLLER VALVE

(75) Inventor: Frederic Gagnon, Ontario (CA)

(73) Assignee: Siemens VDO Automotive, Inc., Chatham (CA)

( * ) Notice: Subject to any disclaimer, the term of this patent is extended or adjusted under 35 U.S.C. 154(b) by 0 days.

(21) Appl. No.: 09/888,618

(22) Filed: Jun. 26, 2001

(65) Prior Publication Data

US 2002/0017322 A1 Feb. 14, 2002

Related U.S. Application Data

(60) Provisional application No. 60/214,667, filed on Jun. 27, 2000, and provisional application No. 60/214,627, filed on Jun. 28, 2000.

(51) Int. Cl.⁷ .................. F16K 31/06; F16K 11/20; H01M 8/04
(52) U.S. Cl. .................. 137/2; 137/487.5; 137/553; 137/883; 137/486
(58) Field of Search ............................. 137/2, 10, 486, 137/487.5, 861, 883, 884, 552, 553, 557

(56) References Cited

U.S. PATENT DOCUMENTS

| | | | |
|---|---|---|---|
| 3,415,262 A | | 12/1968 | Chatman |
| 3,680,831 A | | 8/1972 | Fujiwara |
| 4,174,733 A | * | 11/1979 | Eidsmore et al. ............ 137/552 |
| 4,399,836 A | * | 8/1983 | de Versterre et al. .... 137/487.5 |
| 4,640,310 A | * | 2/1987 | Hartle et al. ................. 137/883 |
| 4,718,457 A | | 1/1988 | Luger |
| 5,117,856 A | | 6/1992 | Kim et al. |
| 5,141,824 A | * | 8/1992 | Hirota .......................... 429/23 |
| 5,366,821 A | * | 11/1994 | Merritt et al. ................. 429/21 |
| 5,441,076 A | * | 8/1995 | Moriya et al. ............... 137/486 |
| 5,531,205 A | | 7/1996 | Cook et al. |
| 5,669,408 A | * | 9/1997 | Nishino et al. .......... 137/487.5 |
| 5,927,682 A | | 7/1999 | Gul et al. |
| 6,196,248 B1 | * | 3/2001 | Myers et al. .................. 137/12 |
| 6,321,782 B1 | * | 11/2001 | Hollister ...................... 137/557 |
| 6,451,467 B1 | * | 9/2002 | Peschke et al. ............... 429/23 |
| 6,648,019 B2 | * | 11/2003 | Gagnon ....................... 137/883 |

FOREIGN PATENT DOCUMENTS

| | | |
|---|---|---|
| FR | 1487913 | 7/1967 |
| FR | 2043936 | 2/1971 |
| FR | 2660396 | 10/1991 |
| GB | 2208427 | 3/1989 |
| GB | 2289743 | 11/1995 |
| JP | 04088270 | 3/1992 |
| JP | 11201320 | 7/1999 |

OTHER PUBLICATIONS

European Search Report (EP 01 20 2472) Mailed Oct. 23, 2003.

* cited by examiner

*Primary Examiner*—Ramesh Krishnamurthy

(57) ABSTRACT

An air mass flow controller valve containing at least two air channels that deliver desired air mass amount from a single inlet to fuel cell(s) through at least one channel of the at least two air channels. Preferably, a single housing encloses the inlet, two air channels and actuating devices. Each air channel includes an actuating device that actuates an associated closure member to regulate air flow from the inlet through the air channel as a function of a signal from an air mass sensor or a controller signal. The signal from each air mass sensor can be directly coupled to the actuating device, or the signal can be used as an error correction signal to feed back control the actuating device associated with the air mass sensor and the air channel.

19 Claims, 2 Drawing Sheets ial patent application Ser. No. 60/214,667, filed on Jun. 27, 2000; and provisional patent application Ser. No. 60/214,627, filed on Jun. 28, 2000, which are hereby incorporated by reference in their entirety.

FIELD OF THE INVENTION

This invention relates to an air mass flow controller valve in general, and more particularly to an air mass flow controller valve for fuel cells containing several flow passages, each controlled independently by an associated electromechanical actuating device.

BACKGROUND OF THE INVENTION

It is believed that a fuel cell consists of two electrodes sandwiched around an electrolyte. It is believed that oxygen, from air, passes over one electrode and hydrogen, from one or more storage device, passes over the other electrode, that, in a chemical reaction, generates electricity, water and heat.

The electricity generated by a fuel cell is believed to be regulated at least in part by the amount of air or oxygen delivered to the fuel cell. Where the fuel cell includes a plurality of fuel cell units, it is believed that there is a need to accurately regulate the amount of air or oxygen delivered to each fuel cell unit.

SUMMARY OF THE INVENTION

The present invention provides an air mass flow controller valve for fuel cells. The airmass flow controller valve can be used to deliver a desired amount of air or any other gases to fuel cells. The flow controller valve includes an inlet disposed along a first axis. At least two channels are in communication with the inlet and are disposed along a second axis. At least one air mass sensor is disposed proximate to one channel of the at least two channels. A seat portion is disposed between the channel of the at least two channels. The flow controller valve also includes at least two closure members. One of the at least two closure members is disposed proximate one channel of the at least two channels. The other of the at least two closure members is disposed proximate the other channel of the at least two channels. Each closure member can be moved to a plurality of positions. Preferably, the plurality of positions includes a first position and a second position. The first position permits air flow between each channel and the inlet. The second position prevents communication between one channel of the at least two channels and the inlet. At least two actuators are coupled to a respective one of the at least two closure members. The at least two actuators are responsive to one of the air mass sensors disposed in each channel of the at least two channels to move a respective one of the at least two closure members between the first position and the second position.

The present invention also provides a method of distributing metered airflow from an inlet to a plurality of channels in a fuel cell. Each channel of the plurality of channels is provided with an air mass flow sensor and a plurality of closure members. Each closure member is contiguous to a seat portion and is disposed in a respective channel of the plurality of channels. Each closure member is movable by an actuator between a first position to permit flow and a second position to prevent flow. The method includes flowing air to the inlet; determining an air mass amount in each channel of the plurality of channels; and metering the air mass amount provided to each channel from the inlet as a function of a desired air amount and the air mass amount determined in each channel.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
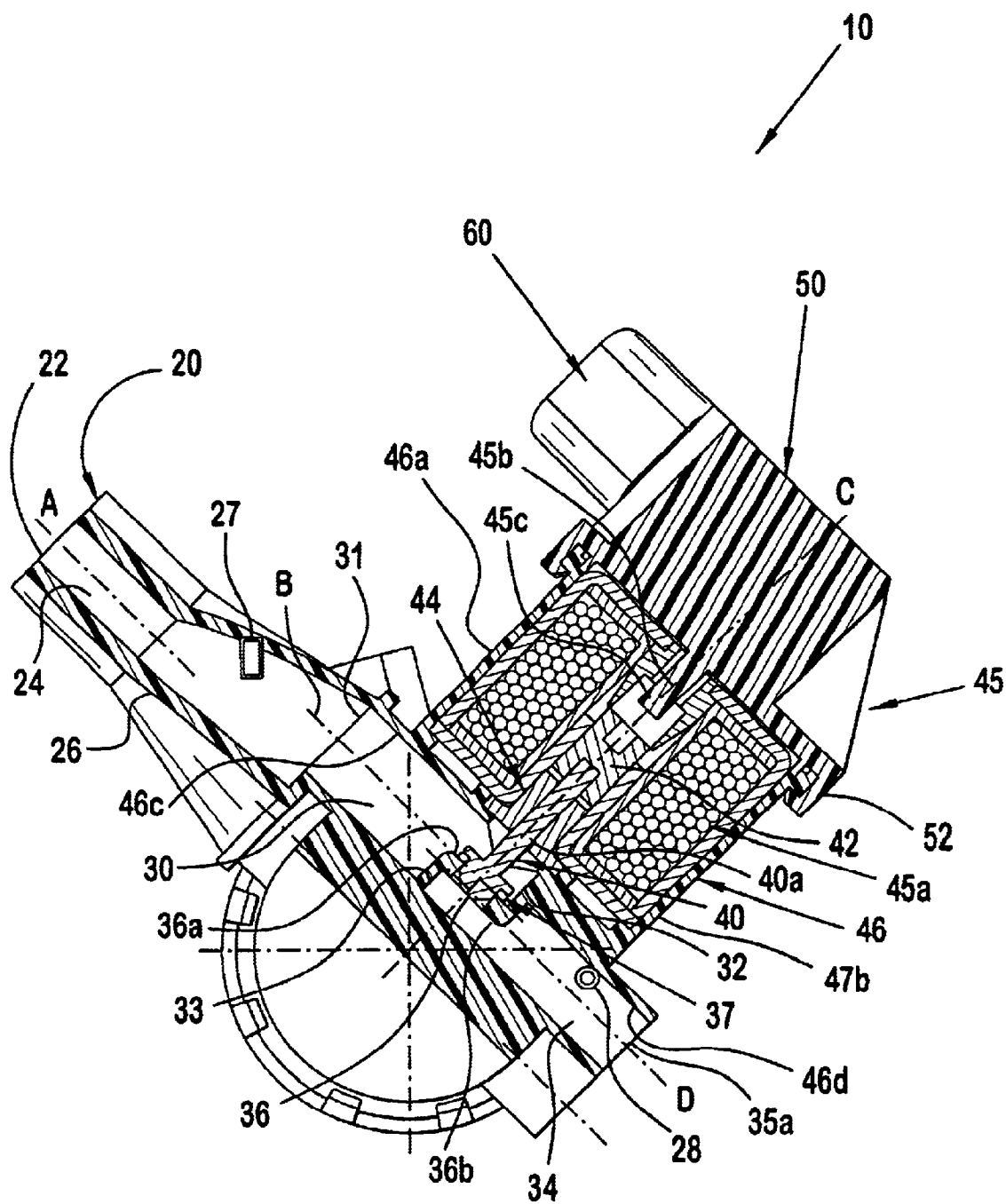
FIG. 1 illustrates a cross-sectional view of an air mass flow controller valve according to a preferred embodiment of the invention.
Figure 2:
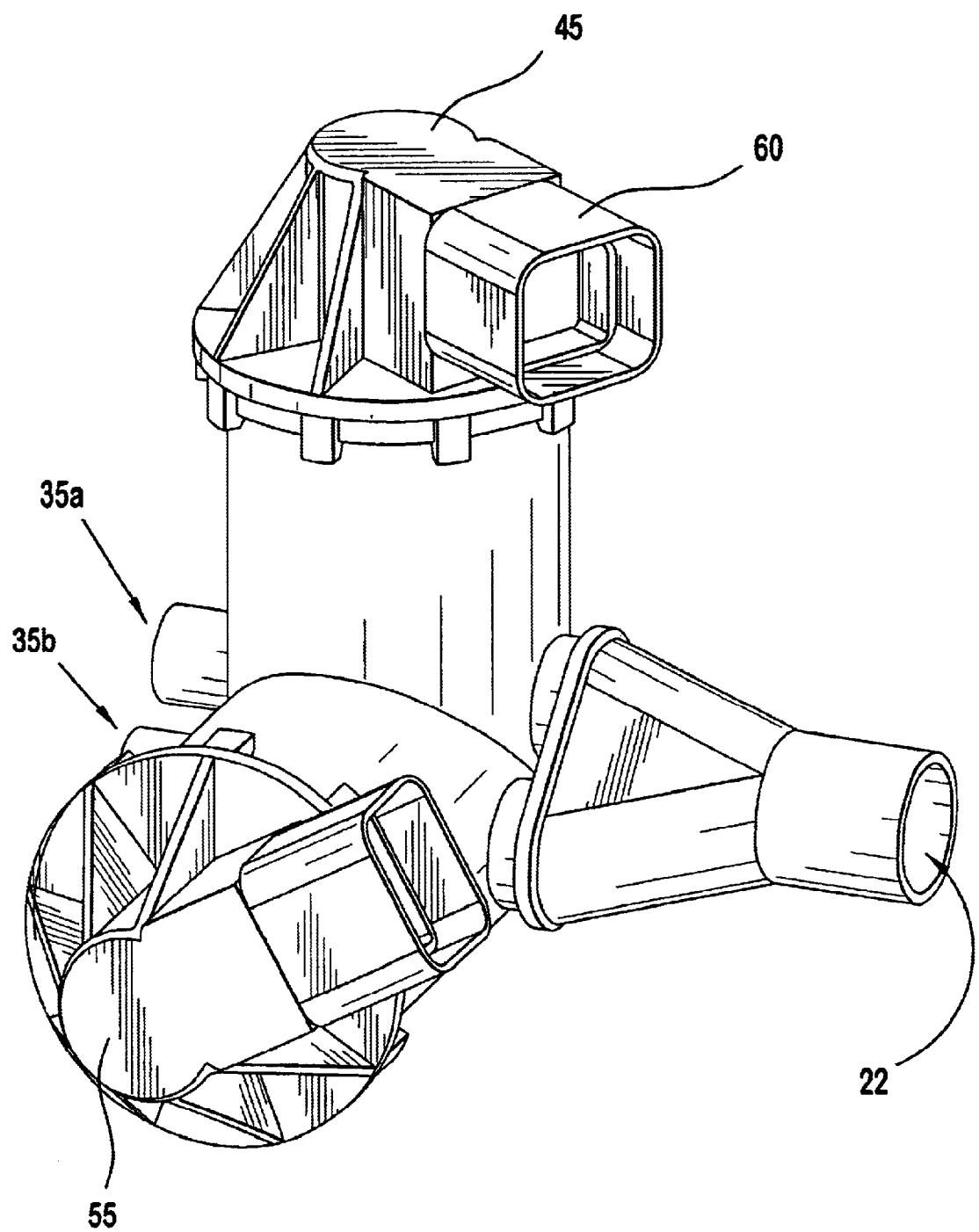
FIG. 2 illustrates an orthogonal view of the air mass flow controller valve of FIG. 1.

FIGS. 1 and 2 illustrate an air mass flow controller valve 10 according to a preferred embodiment. The air mass flow controller valve 10 can deliver air to a reformer of a fuel cell (not shown) on board a vehicle or anywhere else that is necessary, such as, for example, in a fuel cell generating plant. In particular, as shown in FIG. 2, the controller valve 10 includes, preferably, single inlet 22 and two outlet channels. The two outlet channels include a first outlet channel 35a and a second outlet channel 35b enclosed in a housing. Each channel is provided with a closure member that regulates air flow between the inlet and the respective outlet channel. The closure member in each actuating device can be actuated by an actuating device. Preferably, a first actuating device 45 regulates the closure member in first outlet channel 35a, and the closure member in the second outlet channel 35b is regulated by a second actuating device 55. Although the first outlet channel 35a and the first actuating device 45 is described in greater detail below, it is to be understood that the description of the first outlet channel 35a, the inlet 22, the actuating device 45 and the housing is also applicable to the second actuating device 55 and the second outlet channel 35b.

FIG. 1 shows a side view of the air mass flow controller valve 10. The valve 10 includes an inlet housing 20. The inlet housing 20 has an inlet 22, which is disposed along a first axis A. The cross-section of the inlet can be circular, rectangular or any other polygonal cross-sectional shapes. Preferably, the cross-section of the inlet 22 is circular. The inlet 22 has a first portion 24 and a second portion 26. A cross-sectional area of the first portion 24 can be the same as the cross-sectional area of the inlet 22. A cross-sectional area of the second portion 26 can be greater than the cross-sectional area of the first portion 24. Preferably, the difference in cross-sectional areas of the first portion 24 and the second portion 26 results in a decrease in air pressure flowing to the second portion. The first portion 24 and the second portion 26 may be coupled together by bonding or welding two separate portions. Preferably, the first and second portions are formed as a single piece unit which is then fixedly attached to the housing.

The air mass flow controller valve 10 includes at least a first air channel 35a and a second air channel 35b (FIG. 2) that can communicate with at least one inlet 22. The first air channel 35a includes a first inlet channel 30 and a first outlet channel 34. The first inlet channel 30 and the first outlet channel 34 communicate with the inlet 22, and are both disposed along a second axis B. The second air channel 35b includes a second inlet channel (not shown) and second outlet channel (not shown). To maintain brevity, details of the second air channel 35b are not shown. It should be understood, however, that the second inlet channel and the second outlet channel of the second air channel 35b are configured in the same manner as the first air channel 35a as described herein.

At least one pressure sensor is disposed proximate the first inlet channel 30. Preferably, a first pressure sensor 27 is disposed on an inner wall of the second portion 26. The first pressure sensor 27 can be a strain-gauge or piezo-electric type pressure sensor or a resistor type sensor. Preferably, the first pressure sensor 27 is a piezo-electric type pressure sensor.

The first inlet channel 30 includes a first inlet portion 31 disposed along the first axis A and a first outlet portion 32 disposed along an axis transverse to the first axis A. The first outlet channel 34 includes a first inlet portion 33 disposed proximate the first outlet portion 32 along an axis transverse to the first axis A. The first outlet channel 34 constitutes part of the first channel 35a disposed along the fourth axis D.

A seat portion 36 connects the first inlet portion 33 and the first outlet portion 32 to present a generally flat seating surface 36a on which a sealing member 37, preferably an O-ring, is disposed thereon. The seat portion 36 includes an opening extending through the seat portion 36 along the third axis C. The depth of the opening can be defined as a distance between the first axis A and the fourth axis D. A first closure member 40 is disposed, in one position proximate the first inlet channel 30, the first outlet channel 34, and the O-ring 37 of the seat portion 36. The first closure member 40 is movable to a plurality of positions along the third axis C, including a first position and a second position. When the closure member 40 is in the first position, air can flow between the first inlet channel 30 and the first outlet channel 34, whereas in the second position, the closure member 40 prevents communication between the first inlet channel 30 and the first outlet channel 34. The closure member 40 has a stem 40a that is disposed along the third axis C and a seating member 36a that is disposed along the first axis A and the second axis B. The stem and the seating member of the closure member 40 can be formed as a two-piece assembly. Preferably, the stem 40a is integrally formed with the seating member 36b. The seating surface 36a is disposed in a confronting arrangement with the seating member 36b of the first closure member 40. Again, the seating surface 36a of the seat portion 36 may also include at least one sealing member 37, such as an O-ring, disposed between the seating surface of the seat portion 36 and the seating member 36b of the first closure member 40.

In order to move the closure member 40 to different positions along the third axis C, at least one actuating device can be provided to actuate each closure member. Preferably, two actuating devices 45 and 55 (FIG. 2) are provided. The actuating devices 45 and 55 can include pneumatic actuators or electrical actuators. Preferably, the actuating device 45 is an electromagnetic actuator that includes an armature assembly 42 coupled to the first closure member 40, and disposed along the third axis C. The armature 42 is displaceable along the third axis C when electromotive forces are introduced into electromagnetic coil 45a. The electromotive force introduced to the coil 45a is believed to induce the generation of electromagnetic flux in the electromagnetic coil 45a that flows to the armature 42. The flow of magnetic flux to the armature 42 tends to move the armature 42 towards a pole piece 45b so as to complete a magnetic circuit from the coil 45a to the armature 42, the pole piece 45b and back to the coil 45a. Upon deactivation of the device 45, a sliding bearing 44 can be provided to act as a stopper for the armature 42. A position sensor 45c is preferably positioned on an end of the pole piece 45b. Data from the first pressure sensor 27 and the position sensor 45c can be used to determine an air mass amount.

When the device 45 is actuated, the magnitude of displacement of the armature assembly 42 is generally equivalent to the amount of air permitted to flow between the first inlet channel 30 and the first outlet channel 34. The actuating device 45 is responsive to the first pressure sensor 27 and the position sensor 45c to regulate the amount of air flow between the inlet 22 and the first channel 35a as a function of a target air mass amount or a target air mass flow rate. Preferably, the actuating device 45 can be controlled by electrically connecting the coil 45a to a controller (not shown) that outputs a pulse width modulated signal. Here, the pulse width modulated signal represents the target air mass amount or the target air mass flow rate as determined by the controller (not shown). The pulsewidth-modulated signal can be feedback controlled by a "processed signal" from the first pressure sensor 27 and the position sensor 45c to the controller (not shown). As used here, the term "processed signal" indicates that the signal from the first pressure sensor 27 and the position sensor 45c can be processed by an analog to digital converter, and then subsequently treated so that this processed signal can be used to determine the feedback error signal to control the actuating device 45.

Although a pressure sensor and a position sensor can be used to determine the airmass flow rate in one preferred embodiment, it is contemplated that, in another preferred embodiment, the pressure sensor and the position sensor can be replaced with a single airmass sensor 28 disposed in each outlet channel of outlet channels 34 and 35. A signal from the airmass sensor 28 can be processed and treated such that this signal can be used to determine the feedback error signal needed to control the actuating device 45 as described above. The airmass sensor can be a hot-wire type or a resistive type airmass sensor. Preferably, the airmass sensor 28 is a hot-wire type airmass sensor.

The actuating device 45 is disposed in an actuator housing 46 that includes a first wall 46a and a second wall 46b disposed along the third axis C, a third wall 46c disposed along the second axis B, and a fourth wall 46d disposed along the fourth axis D. The first wall 46a and the third wall 46d are formed as part of the first inlet portion 31. The second wall 46b and the fourth wall 46d are formed as part of the second outlet portion 35. The actuator housing 46 further includes a sensor cap 50, which is configured to couple with the first wall 46a and the second wall 46b in a locking arrangement. The locking arrangement may be achieved by a plurality of locking clips 52 extending from a base of the sensor cap 50. The cap 50 also includes an electrical connector 60 that can be used to couple the controller (not shown) to the first pressure sensor 27 and the position sensor 45c in each channel and the controller (not shown) to the actuating device 45.

The operation of one of the actuating devices 45, 55 in the air mass flow controller valve 10 will now be described. Specifically, in the actuating device 45, the armature 42 acts in response to signals provided by a controller or by the first pressure sensor 27 and the position sensor 45c (or a single airmass sensor 28) to regulate the flow of air by displacing the first closure member 40 between the first position and the second position. In the first position, the first closure member 40 is unseated. Thus, air that flows into the inlet 22 flows through the first inlet channel 30 past the first closure member 40 and through the first outlet channel 34 exiting the air mass flow controller valve 10 through the second outlet portion 35. In the second position, the first closure member 40 is seated against the seat portion 36 and the sealing member 37. Thus, air that flows into the inlet 22 flows into the first inlet channel 30, but is prevented from flowing through the first outlet channel 34 by the seating of the first closure member 40. Likewise, the air flow through the second channel 35b can also be regulated by the other actuating device 55 and its associated closure member, pressure and position sensors (or a single airmass sensor).

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An air mass flow controller valve for fuel cells, the flow controller valve comprising:

an inlet disposed along a first axis;

at least two channels in communication with the inlet, the at least two channels disposed along a second axis;

at least one air mass sensor disposed proximate each of the at least two channels;

a seat portion disposed in each of the at least two channels;

at least two closure members, one of the at least two closure members disposed proximate one channel of the at least two channels, the other of the at least two closure members disposed proximate the other channel of the at least two channels, each closure member including a stem extending from a seating member and being movable to a plurality of positions, a first position permitting air flow in a respective channel, and a second position preventing air flow in a respective channel; and at least two actuators, each actuator including an armature and an electromagnetic coil, the respective stem of each closure member extending into a respective electromagnetic coil and being coupled to a respective armature, each of the at least two actuators responsive to a respective air mass sensor to move a respective closure member between the first position and the second position.

2. The valve of claim 1, wherein the seat portion further comprises an annular seat having a third axis transverse to one of the first axis and second axis.

3. An air mass flow controller valve for fuel cells, the flow controller valve comprising:

an inlet disposed along a first axis;

at least two channels in communication with the inlet, the at least two channels disposed along a second axis;

at least one air mass sensor disposed proximate one of the at least two channels;

a seat portion disposed in one channel of the at least two channels;

at least two closure members, one of the at least two closure members disposed proximate one channel of the at least two channels, the other of the at least two closure member disposed proximate the other channel of the at least two channels, each closure member movable to a plurality of positions, a first position permitting air flow in each channel from the inlet and a second position preventing communication in one channel of the at least two channels and the inlet; and at least two actuators coupled to a respective one of the at least two closure members, the at least two actuators responsive to one of the air mass sensors in each channel of the at least two channels to move a respective one of the at least two closure members between the first position and the second position, wherein the inlet further comprises a portion having a first cross sectional area and a second cross sectional area proximate the at least two channels, the second cross sectional area being greater than the first cross-sectional area.

4. An air mass flow controller valve for fuel cells, the flow controller valve comprising:

an inlet disposed along a first axis;

at least two channels in communication with the inlet, the at least two channels disposed along a second axis;

at least one air mass sensor disposed proximate one of the at least two channels;

a seat portion disposed in one channel of the at least two channels;

at least two closure members, one of the at least two closure members disposed proximate one channel of the at least two channels, the other of the at least two closure member disposed proximate the other channel of the at least two channels, each closure member movable to a plurality of positions, a first position permitting air flow in each channel from the inlet and a second position preventing communication in one channel of the at least two channels and the inlet; and at least two actuators coupled to a respective one of the at least two closure members, the at least two actuators responsive to one of the air mass sensors in each channel of the at least two channels to move a respective one of the at least two closure members between the first position and the second position, wherein the at least one air mass sensor comprises a pressure sensor disposed in the inlet and a position sensor that senses the position of the actuator.

5. The valve of claim 2, wherein the closure member is disposed proximate the annular seat, the closure member operable to move along the third axis between the first position and second position.

6. The valve of claim 1, wherein each of the at least two channels further comprises an inlet portion disposed along the second axis wad an outlet portion disposed along a fourth axis spaced from the second axis by a distance, the distance between the second axis and the fourth axis defining the seat portion.

7. The valve of claim 6, wherein the seat portion further comprises a seating surface in a confronting arrangement with the closure member, the seating surface having at least one seal disposed between the seating surface and the closure member.

8. The valve of claim 1, wherein each of the at least of the two actuators further comprises a sliding bearing, the sliding bearing configured to permit the closure member to reciprocate between the first position and the second position.

9. The valve of claim 6, wherein the at least two actuators further comprise a housing for each actuator, the housing having a first wall and a second wall disposed along the third axis, a third wall disposed along the second axis mid a fourth wall disposed along the fourth axis, the first and third walls formed as part of the inlet portion, the second and fourth walls formed as part of the outlet portion.

10. The valve of claim 9, wherein the housing further comprises a sensor cap configured to couple with the first wall and second wall in a locking arrangement.

11. The valve of claim 10, wherein the sensor cap further comprises an electrical connector.

12. The valve of claim 9, wherein the first arid third walls of each actuator are orthogonal to the first and third walls of the other actuator of the at least two actuators.

13. A method of distributing metered airflow from an inlet to a plurality of channels in a fuel cell, each channel of the plurality of channels provided with an air mass flow sensor that provides a signal indicating measured air amount flowing in each channel of the plurality of channels, a plurality of closure members, each closure member being contiguous to a seat portion and disposed in a respective channel of the plurality of channels, each closure member being movable by an actuator between a first position to permit flow and a second position to prevent flow, the method comprising:

flowing air to the inlet;

determining an air mass amount in each channel of the plurality of channels; and metering the air mass amount provided to each channel from the inlet as a function of a desired air amount and the air mass amount determined in each channel.

14. A method of distributing metered airflow from an inlet to a plurality of channels in a fuel cell, such channel of the plurality of channels provided with an air mass flow sensor that provides a signal indicating measured air amount flowing in each channel of the plurality of channels, a plurality of closure members, each closure member being contiguous to a seat portion and disposed in a respective channel of the plurality of channels, each closure member being movable by an actuator between a first position to permit flow and a second position to prevent flow, the method comprising:

flowing air to the inlet;

determining an air mass amount in each channel of the plurality of channels; and metering the air mass amount provided to each channel from the inlet as a function of a desired air amount and the air mass amount determined in each channel;

wherein the flowing air further comprises flowing air in a passage with a first portion and a second portion, first portion having a first cross section area and the second portion with a second cross sectional area, the second cross sectional area being greater than the first cross sectional area.

15. The method of claim 13, wherein the determining of the air mass amount further comprises sensing a voltage of a transducer disposed in each channel of the plurality of channels.

16. The method of claim 13, wherein the metering further comprises modulating the closure member between the first position and the second position.

17. The method of claim 16, wherein the modulating further comprises reciprocating the closure member in response to pulse width modulated signals.

18. The method of claim 16, wherein the modulating further comprises feedback controlling the closure member between the first position and the second position based on a difference between the desired air amount and determined air amount.

19. An air mass flow controller valve for fuel cells, the flow controller valve comprising:

an inlet disposed along an inlet axis;

first and second channels in communication with the inlet, the first and second channels being respectively disposed along a first channel axis and a second channel axis;

an air mass sensor disposed proximate the first channel;

first and second seat portions being respectively disposed in the first and second channels;

first and second closure members being respectively disposed in the first and second channels, each closure member including a stem extending from a seating member and being movable between a first position permitting air flow in its respective channel and a second position preventing airflow in its respective channel; and first and second actuators each including an armature and an electromagnetic coil, the respective stem of each closure member extending into a respective electromagnetic coil and being coupled to a respective armature, the first actuator being responsive to the air mass sensor to move the first closure member between the first position and the second position.

* * * * *